Sept. 14, 1948.  N. E. LINDENBLAD  2,449,078
COMMUTATOR APPARATUS
Filed March 15, 1943  2 Sheets—Sheet 1
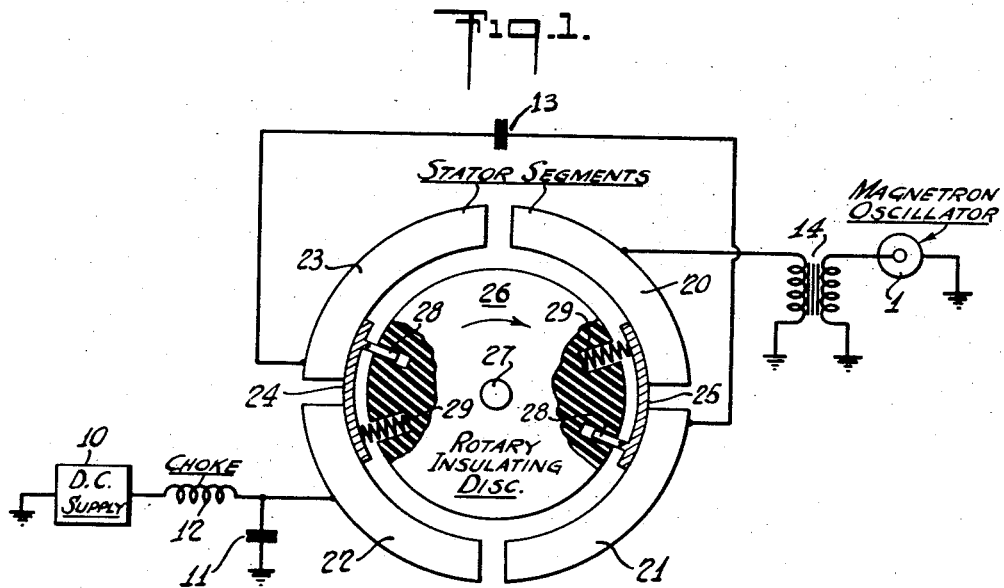
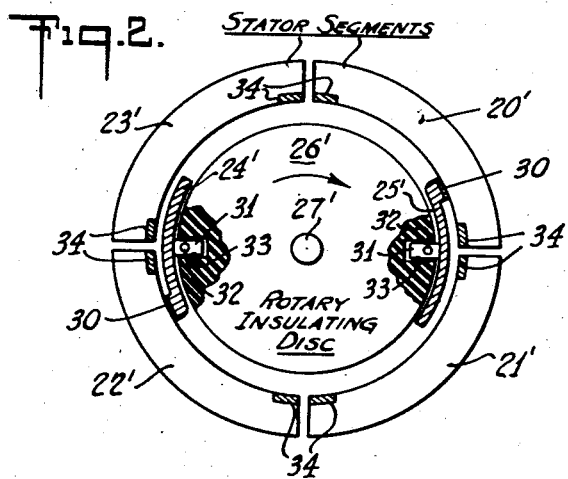
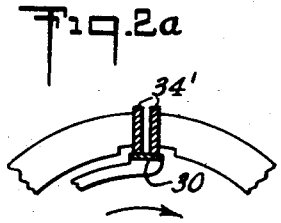
INVENTOR
NILS E. LINDENBLAD.
BY
ATTORNEY

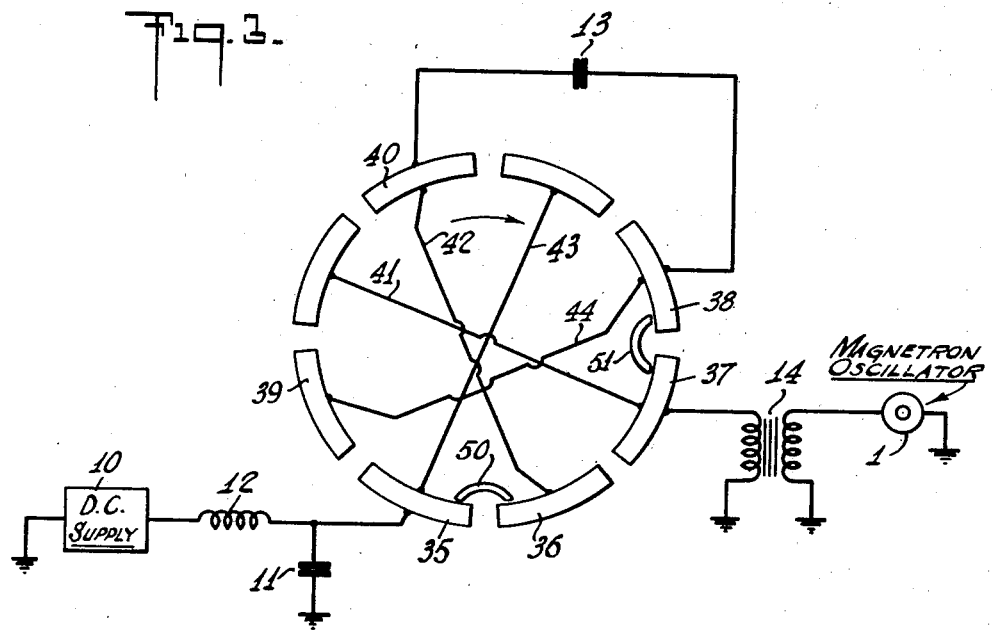
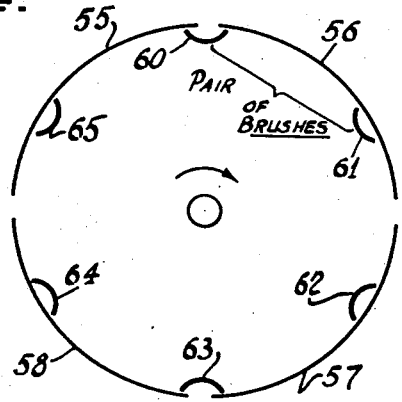

Patented Sept. 14, 1948

2,449,078

UNITED STATES PATENT OFFICE 2,449,078

COMMUTATOR APPARATUS

Nils E. Lindenblad, Port Jefferson, N. Y., assignor to Radio Corporation of America, a corporation of Delaware Application March 15, 1943, Serial No. 479,220

5 Claims. (Cl. 200—26)

This invention relates to pulse generators, and more particularly to a novel form of commutator for aiding in converting direct current power to power in the form of unidirectional pulses of extremely short duration, such as might be suitable for use with pulse echo systems of the radio locating type.

In accordance with the preferred system employing the principles of the invention, the apparatus for converting the direct current power to unidirectional pulses comprises a source of direct current supply, a storage condenser coupled to the source, a load, a condenser of small capacity compared to said storage condenser adapted to be charged from the storage condenser and discharged through the load, and a novel commutator arrangement interposed between the storage condenser and small capacity condenser for enabling the charging and discharging of the small capacity condenser in such manner that pulses of extremely short duration are passed always in the same direction through the load.

The salient feature of the present invention lies in the commutator arrangement which, briefly stated, comprises a plurality of equal length stator segments or bars arranged on a circle and a pair of brushes adapted to rotate around the stator segments and to bridge the adjacent ends of different stator bars.

In accordance with one embodiment of the invention, there are employed four stator segments of equal length, insulated from each other, and which are mounted in the four quadrants of a circle in such manner as to provide small gaps between adjacent segments. The rotating brushes are arranged to rotate on the inside diameter of the circle on which the stator bars lie. These brushes are mounted on diametrically opposite sides of a rotating insulating disc. The disc supports the brushes and is driven by a motor. The brushes are of such length that as they rotate they will simultaneously bridge oppositely located gaps of the stator segments on the interior surfaces of the segments.

In accordance with another embodiment of the invention, the number of stator segments is increased to eight or any convenient integral multiple of the original four stator segment scheme, in order to reduce the speed of the rotating brushes and still obtain the same number of pulses per second. Of course, where the number of stator segments is greater than four (such as eight or twelve), the two rotating brushes are no longer located at diametrically opposite ends with respect to the insulating supporting disc, as originally described above in connection with the four stator segment scheme, but instead so mounted that both brushes simultaneously bridge the gaps between two pairs of segments located next to one another.

The present invention is hereinafter described with special reference to a radio locating system for radiating ultra short wave pulses of extremely short duration, such as one microsecond or so. In such a system, it is required that the short duration pulses be separated by intervals of time considerably greater than the duration of each pulse. It should be understood, however, that the invention is not specifically limited to such a system and may find other applications.

In the drawing:

Fig. 1 shows one specific embodiment of the invention;

Fig. 2 shows a preferred type of commutator arrangement somewhat different from that of Fig. 1, which may be used in the system of Fig. 1;

Fig. 2a is a detail of a modification of Fig. 2; and

Figs. 3 and 4 show still further modifications of the commutator arrangement of the invention.

Throughout the figures of the drawing, the same parts are represented by the same reference numbers.

Referring to Fig. 1 in more detail, there is shown a magnetron oscillator 1 which it is desired to excite momentarily and periodically for extremely short periods of time in order to enable the radiation of pulses of high power compared to the available output during the steady state or continuous operation condition of the oscillator. One way of exciting this magnetron oscillator is to supply high voltage pulses to the cathode electrode of the magnetron oscillator whose anode electrode is grounded. The oscillator is shown diagrammatically, and the details thereof are not illustrated since they form no part of the present invention per se. To supply these high power pulses, there is provided a source of direct current power 10 which is coupled to a storage condenser 11 through a choke coil 12. This direct current source 10 may be a rectifier, a direct current generator or a large battery. A condenser 13, of relatively small capacity compared to the capacity of the storage condenser 11, is adapted (by means of the commutator arrangement to be hereinafter described) to be charged and subsequently discharged periodically through the load in the same direction. The load in this case is the step-up transformer 14 whose primary winding is connected to one of the stator segments 20 of the commutator arrangement and whose secondary winding is connected to the cathode of the magnetron oscillator. The condenser 13 is connected between stator segments 21 and 23 while the storage condenser 11 is connected to the stator segment 22. Two brushes 24 and 25 are mounted on opposite sides of a rotary insulating disc 26 which is driven in the direction of the arrow by a shaft 27 from a motor (not shown). This insulating disc may be made of Bakelite or other suitable material. The brushes 24 and 25 are identical and mounted in similar fashion on the rotary disc. Each brush comprises a metallic segment designed to wipe over the interior surfaces of the stator segments or bars as the brush rotates, and the lengths of the brushes are such that they will bridge opposite gaps between the stator segments, as shown. Each brush is provided near one end with a pin 28 which fits into a slot in the rotary insulating disc so as to move freely therein as the disc rotates, and is provided near its other end with a spiral spring 29 adapted to exert outward pressure on the brush and to assure contact between the brush and the segments as the disc rotates. The spring 29 assures the fact that the front edge of the brush does not catch in the gap during the acceleration and retardation periods when the centrifugal force is insufficient to effect hugging. Slots in the rotary disc accommodate the springs. The centrifugal force engendered by the rotary disc during motion will assure wiping contact between the brushes and the segments.

In the operation of the invention, the direct current source of supply 10 will store a charge on the condenser 11 which preferably has a capacity at least ten to fifteen times as large as the condenser 13. Let us assume that the voltage of the direct current supply is 1000 volts. On first connecting the circuit as shown in Fig. 1, the condenser 13 will be charged over a path including storage condenser 11, stator segment 22, brush 24, stator segment 23, condenser 13, stator segment 21, brush 25, stator segment 20 and the primary winding of iron core step-up transformer 14. There is thus produced a pulse of current through the primary winding of transformer 14 corresponding to the charge placed on condenser 13 at the voltage of the direct current charging source, assumed to be 1000 volts. As the brushes rotate, however, the connections of the condenser 13 are periodically reversed. Thus, in the position where brush 24 bridges the gap between stator segments 23 and 20 and brush 25 bridges the gap between stator segments 22 and 21, a path will be completed from the storage condenser 11 through segments 22 and 21 to the right hand side of condenser 13, through condenser 13, and through stator segments 23 and 20 to the primary winding of transformer 14. In effect, condensers 13 and 11 are now placed in series because the polarities of both of these condensers are additive at the moment the circuit connections are reversed, as described. A pulse is thus produced across the primary winding of transformer 14 with an initial voltage of 2000 volts. This initial pulse voltage will diminish according to the time constants of the circuit. Actually, as the pulse with the initial voltage double that of direct current source 10 dies away, the condenser 13 is completely discharged through the primary winding of the transformer 14 and is then recharged in the opposite direction to assume the polarity which the condenser possessed before the connections were reversed. The whole complete pulse of double voltage through the transformer, therefore, includes both the discharge and the charging of the condenser 13 as one continuous or uninterrupted phenomenon. As the disc 26 continues to rotate to assume the position again shown in the drawing, the connections of the condenser 13 to the transformer and storage condenser are again reversed in an obvious manner and again there is produced a pulse through the load having an initial voltage of 2000 volts. Thus, subsequent to the first pulse caused by first connecting the circuit together, all subsequent pulses will have a voltage across the primary of the transformer of a value twice the voltage of the direct current source. If the transformer 14 is a step-up transformer having a voltage transformation of one to ten, the 2000 volt pulse across the primary will produce a 20,000 volt pulse across the secondary which is applied momentarily to an electrode of the oscillator 1 to cause the oscillator to break out into oscillations. This mode of operation is substantially similar to that described in my copending application, Serial No. 473,677, filed January 27, 1943, to which attention is directed.

By a suitable design of this special commutator I have been able to produce pulses having a duration of one microsecond and even less, for use with a radio locating device. In one embodiment of the invention actually tried out in practice, the rotary disc 27 was driven by a 1/15 horsepower, 60 cycle motor, at a speed of 3600 rotations per minute. The stator segments had a diameter about 2 inches and the brushes were about 3/8 inch long. The pulse step-up transformer 14 had a voltage transformation ratio of one to 15.

Fig. 2 shows a commutator arrangement which is preferred in my pulse generator system. The rotary insulating disc 26' of Fig. 2 is substantially the same as the disc 26 of Fig. 1, except for the manner of mounting the brushes. The brushes 24' and 25' are made generally of steel or bronze except for the contacting surface 30 which is preferably made of molybdenum. The molybdenum surface 30 is made of this material because molybdenum is very hard and has a high melting point, excellent mechanical wearing properties, good electrical wearing properties, and does not deteriorate under arcing. The assembly of each brush 24' and 25' is so designed that the end containing the molybdenum surface 30 is slightly heavier than its opposite end. Each brush is supported by the rotary insulating disc 26' by virtue of a pin 31 mounted substantially in the center of the brush and inserted into a depression on the supporting insulating disc, as shown. A pivot 32 enables each brush to swing inwardly and outwardly with respect to the stator segments. A steel pin 33 holds the brush assembly in place on the insulating support 26'. As the rotary insulating disc 26' rotates in the direction of the arrows, the heavy ends of the brushes, namely the ends having the contact surfaces 30, are drawn outward by centrifugal force and the molybdenum contact surfaces 30 bridge opposite gaps of the stationary segments or bars. The two brushes may be arranged to make contact either simultaneously or staggered, that is, one slightly before the other. In the former case, the jumping over voltages is divided over two gaps and reduces sparking to some extent. The direction of rotation indicated by the arrow is quite important in order to avoid brush chatter. The direction must be such, for this particular type of brush, that the force vector from the hinge points outward and through the periphery of rotation. The stator segments 20′, 21′, 22′ and 23′ are quite similar to the stator segments of Fig. 1, except that they are provided with small molybdenum inserts 34 at the points near the gaps which are bridged by the brushes. Except for these molybdenum inserts, the stator segments may be made of cast iron or bronze. In view of the fact that the commutator of Fig. 2 can be used in connection with the same circuit shown with Fig. 1, it is not believed necessary to repeat the circuit elements in Fig. 1.

Fig. 2a is a detail showing an alternative arrangement for the molybdenum inserts for the stator segments of Fig. 2. Only two stator segments have been shown, although it will be obvious that there are four, as shown in Figs. 1 and 2, or integral multiples as described hereinafter in connection with Fig. 3. The difference between the arrangement of Fig. 2a and Fig. 2 resides in the fact that the stator segments of Fig. 2a are provided with molybdenum inserts 34′ arranged radially rather than circumferentially, as shown in Fig. 2. The arrangement of Fig. 2a enables the molybdenum inserts to be adjusted in a radial direction so as to always contact the surface 30 of the brush despite mechanical wear.

Fig. 3 shows an arrangement similar to that of Fig. 1 and differs therefrom primarily in the number of commutator segments employed and in the arrangement of the brushes. Since the brushes can take either of the forms shown in Figs. 1 and 2, they have been indicated diagrammatically in Fig. 3 merely as bridging plates 50 and 51 in order to simplify the drawing. Fig. 3 shows eight stationary segments mounted on a circle. These stationary segments are, of course, of the same length and equally spaced from one another. The brushes, as before, are of sufficient length at their contacting surfaces to bridge the gaps between segments. The rotating disc which supports the brushes has not been shown and may take either the form of Fig. 1 or that of Fig. 2, depending upon the type of brush employed for Fig. 3.

It should be noted that the brushes 50, 51 of Fig. 3 are no longer placed diagrammatically opposite with respect to the rotating disc but instead are arranged to bridge alternate gaps. Diametrically oppositely located stator segments are shown connected together by means of the four connections 41, 42, 43 and 44. The small capacity condenser 13 is arranged across the pair of stator segments which are separated from each other by another stator segment, as shown. In the position shown in the drawing of Fig. 3, a path is completed from the direct current source 10 or storage condenser 11 to the primary winding of the transformer 14 through stator segment 35, brush 50, stator segment 36, lead 42, stator segment 40, condenser 13, stator segment 38, brush 51 and stator segment 37. At a subsequent moment when the brush 51 bridges the gap between stator segments 36 and 37 and the brush 50 bridges the gap between stator segments 35 and 39, it will be seen that another path will be completed from the storage condenser 11 to the primary winding of the transformer 14 and including condenser 13, but at this time the connections from the condenser to the associated circuit elements will be reversed.

By means of the system of Fig. 3, I am able to reduce the speed of rotation of the insulating disc by one-half relative to the four segment arrangement of Figs. 1 and 2, and still obtain the same number of pulses per second to excite the load. If desired, the number of stator segments on the commutator can be further increased by multiples of four, so that it may have twelve or sixteen segments with a consequent further reduction in the speed of rotation. Obviously, where additional stator segments are employed in a commutator, the connections between the stator segments and the arrangement of the brushes must be such as to assure continual reversals in the connections from the condenser 13 relative to the load and the direct current source.

Other pulse rates or lower driving speeds may also be attained by increasing the number of brushes. Thus, for example, in place of the single pair of brushes shown in Figs. 1 and 2, there may be six evenly distributed brushes instead of two, as shown in Fig. 4. This arrangement of Fig. 4 becomes exceedingly practical when the brush is reduced to a mere sliver of molybdenum being slung around by means of radial pins which are integral with the rotor. When the brush of Fig. 4 takes the form of a thin molybdenum surface, it is very satisfactory and chatter free, having a minimum of mass.

Referring to Fig. 4 in more detail, there is shown four equal length arcuate shaped stator segments 55, 56, 47, and 58 equally spaced from one another and mounted on a circle. Pairs of brushes 60, 61; 62, 63; and 64, 65, mounted on a rotor, not shown, have been indicated merely diagrammatically and are adapted to bridge opposite gaps between the stator segments. Thus, in the particular position shown in the drawing, diametrically oppositely disposed brushes 60 and 63 bridge opposite the gaps between segments 55 and 56 and 57 and 58 respectively. At some time later, diametrically oppositely disposed brushes 61 and 64 will bridge the other opposite gaps, and at some still later time diametrically oppositely disposed brushes 62 and 65 will bridge the first two. These brushes are preferably thin slivers of molybdenum and mounted in suitable fashion indicated above on a rotor of insulating material.

The special commutator of the invention as described hereinabove, has the following advantage, among others. As the operating voltages increase, the commutator gradually functions more and more in a manner of a rotary spark gap (i. e., the discharge between the brush and the segment which it approaches takes place before actual conductive contact is made between these two elements). The only difference between a rotary spark gap as known in the art, and a conductive commutator assembly as previously described, is that in the latter case the minimum distance between brush and stator segment is zero, while in the former there is always some finite distance greater than zero between brush and segment which must be broken down. In my commutator, the distance required for spark over always can be obtained after continued use of the commutator caused by mechanical wear of the elements. That is, even though the edges of the surface wear with sparking, the new portions of this surface will always be utilized or shift into place as the brushes rotate. In a rotary spark gap arrangement, however, as the sparking wears away the electrode surfaces, the distance between the surfaces increases. The commutator of the invention has been found to be advantageous particularly in the intermediate voltage regions, say 1000 to 3000 volts, which are too low for regular spark gap operation, because the distances between brushes and segments always remain the same for sparking in view of the shifting of new portions of electrode surfaces as the electrodes wear with usage.

Inasmuch as I employ the commutators of the invention in a system which provides microsecond duration pulses through the transformer 14, it should be understood that the discharge phenomenon through the load is usually completed before or at the time when the rotating brush makes actual contact with the last segment of the pair which it is supposed to bridge.

It is obvious that the brushes can also be so located that immediately following the establishment of contact by one brush, the circuit may be opened by the second brush, since the pair is in series. When more than one pair of brushes are used, the two brushes in each pair may be arranged for a similar sequence.

What is claimed is:

1. In apparatus for converting direct current power to higher voltage unidirectional current pulses, a commutator comprising four equal length arcuate-shaped stator segments or bars of metallic material arranged on a circle, or integral multiples thereof, said segments being insulatingly spaced from one another by equal length air gaps, a pair of similarly dimensioned arcuate-shaped spaced brushes which are shorter than said stator segments and mounted on a rotatable insulating support whose axis of rotation is the center of said circle, said brushes being adapted to slide over those circumferential surfaces of the stator segments which face toward the center of said circle, said brushes being movable in a radial direction in the space between the insulating support and the interior surfaces of said stator segments, whereby the centrifugal force engendered by rotation of said support causes the brushes to move outwardly and assure electrical contact with said stator segments, each brush having a length of contact surface sufficient to bridge one of said gaps, said brushes being so spaced on said support that they bridge the gaps between different pairs of stator segments, a motor continuously driving said rotatable support, and electrical circuit connections to all of said stator segments.

2. In pulse generator apparatus, a commutator comprising four equal length stator arcuate-shaped segments or bars of metallic material arranged on a circle, or integral multiples thereof, said segments being insulatingly spaced from one another by air gaps, a pair of similarly dimensioned arcuate-shaped spaced metallic brushes which are shorter than said stator segments and pivotally mounted on the periphery of a rotatable insulating support whose axis of rotation is the center of said circle, said support having a diameter sufficiently smaller than the inside diameter of a circle produced by an imaginary line joining the interior surfaces of said segments to permit a certain amount of movement of the brushes in a radial direction between the support and the stator segments, said brushes each having at one end a contact surface which is adapted to slide over the interior surfaces of said segments and is of sufficient length to bridge any one of said gaps, whereby rotation of said support produces a centrifugal force which causes the contact surfaces of brushes to move outwardly and assure electrical contact with said stator segments, said brushes being so spaced on said support that they bridge the gaps between different pairs of stator segments.

3. In pulse generator apparatus, a commutator comprising four equal length stator arcuate-shaped segments or bars of metallic material arranged on a circle, or integral multiples thereof, said segments being insulatingly spaced from one another by equal length air gaps, a pair of spaced arcuate-shaped metallic brushes of shorter length than said stator segments and pivotally mounted on the periphery of a rotatable insulating support whose axis of rotation is the center of said circle, said support having a diameter sufficiently smaller than the inside diameter of a circle produced by an imaginary line joining the interior surfaces of said segments to permit a certain amount of movement of the brushes in a radial direction between the support and the stator segments, said brushes each having at only one end a contact surface which is adapted to slide over the interior circumferential surfaces of said segments and is of sufficient length to bridge any one of said gaps, whereby rotation of said support produces a centrifugal force which causes the contact surfaces of brushes to move outwardly and assure electrical contact with said stator segments, the said brushes being so spaced and arranged on the rotatable support that when the contact surface of one brush bridges the gap between two adjacent stator segments, the contact surface of the other brush will simultaneously bridge the gap between the next two stator segments as seen looking in the direction of rotation.

4. In pulse generator apparatus, a commutator comprising four equal length arcuate-shaped stator segments or bars of metallic material arranged on a circle, or integral multiples thereof, said segments being insulatingly spaced from one another by air gaps, a pair of spaced similarly dimensioned arcuate-shaped metallic brushes which are of shorter length than said stator segments and pivotally mounted on the periphery of a rotatable insulating support whose axis of rotation is the center of said circle, said support having a diameter sufficiently smaller than the inside diameter of a circle produced by an imaginary line joining the interior surfaces of said segments to permit a certain amount of movement of the brushes between the support and the stator segments, said brushes each having at only one end a contact surface which is adapted to slide over the interior circumferential surfaces of said segments and is of sufficient length to bridge any one of said gaps, said contact surface of the brush and the portions of the stator segments adjacent the gaps being made of molybdenum, while the other portions of said brushes and stator segments are made of different metallic materials, whereby rotation of said support produces a centrifugal force which causes the contact surfaces of brushes to move outwardly and assure electrical contact with said stator segments, said brushes being so spaced on said support that they bridge the gaps between different pairs of stator segments.

5. In pulse generator apparatus, four equal length arcuate-shaped stator segments or bars of metallic material arranged on a circle, said segments being insulatingly spaced from one another by equal length air gaps, a pair of spaced similar dimensioned arcuate-shaped brushes which are shorter than said stator segments and mounted on the periphery of a rotatable insulating disc-like support whose axis of rotation is the center of said circle, said brushes being pivotally mounted near their centers to diametrically opposite sides of said rotatable support, each of said brushes being slightly heavier at one end than its other end, said heavier end having a contact surface adapted to slide over the interior circumferential surfaces of said stator segments, said brushes being so arranged and having such lengths that when the contact surface of one brush bridges the gap between two adjacent stator segments the contact surface of other brush will simultaneously bridge the gap between the other two stator segments, and a motor continuously driving said rotatable support in such direction that the centrifugal force produced by the rotation of said support causes the contact surfaces of the brushes to make contact with said stator segments.

NILS E. LINDENBLAD.

REFERENCES CITED

The following references are of record in the file of this patent:

UNITED STATES PATENTS

| Number | Name | Date |
|---|---|---|
| 926,066 | Lincoln | June 22, 1909 |
| 1,295,206 | Redmond | Feb. 25, 1919 |
| 1,445,662 | Bradley | Feb. 20, 1923 |
| 1,474,376 | Morse | Nov. 20, 1923 |
| 2,234,834 | Scott | Mar. 11, 1941 |
| 2,241,050 | Bedford | May 6, 1941 |
| 2,247,755 | Hensel | July 1, 1941 |

FOREIGN PATENTS

| Number | Country | Date |
|---|---|---|
| 201,759 | Germany | Sept. 15, 1908 |
| 16,859 | France | Nov. 27, 1912 |
| 19,067 | France | Mar. 25, 1914 |